United States Patent

[11] 3,602,383

[72] Inventor Graham Howat
Flat 3, Longlow House, South Road
Buckinghamshire, Amersham, England
[21] Appl. No. 883,057
[22] Filed Dec. 8, 1969
[45] Patented Aug. 31, 1971
[32] Priority Dec. 10, 1968
[33] Great Britain
[31] 58581/68

[54] APPARATUS FOR UNLOADING BAGGAGE FROM CONTAINERS
10 Claims, 16 Drawing Figs.

[52] U.S. Cl. ................................................ 214/307
[51] Int. Cl. ..................................................... B65g 65/34
[50] Field of Search ............................................ 214/49, 52, 47, 46.26, 307, 314

[56] References Cited
UNITED STATES PATENTS
| | | | |
|---|---|---|---|
| 1,253,640 | 1/1918 | Spear | 214/46.26 |
| 2,166,561 | 7/1939 | Spiegl | 214/52 A |
| 2,344,664 | 3/1944 | Adams | 214/307 |

Primary Examiner—Gerald M. Forlenza
Assistant Examiner—John Mannix
Attorney—Sughrue, Rochwell, Mion, Zinn & Macpeak ABSTRACT: In large aircraft pieces of baggage are carried in containers which must be unloaded on arrival. The invention consists in apparatus for mechanically unloading the containers. This apparatus includes an open-ended channel into which baggage containers are introduced and clamped, and means for rocking the channel as a whole about a horizontal axis to bring a sidewall onto a sloping support, and then rocking back the channel and container but not the sidewall, so that the baggage slides out under gravity over the sloping sidewall.

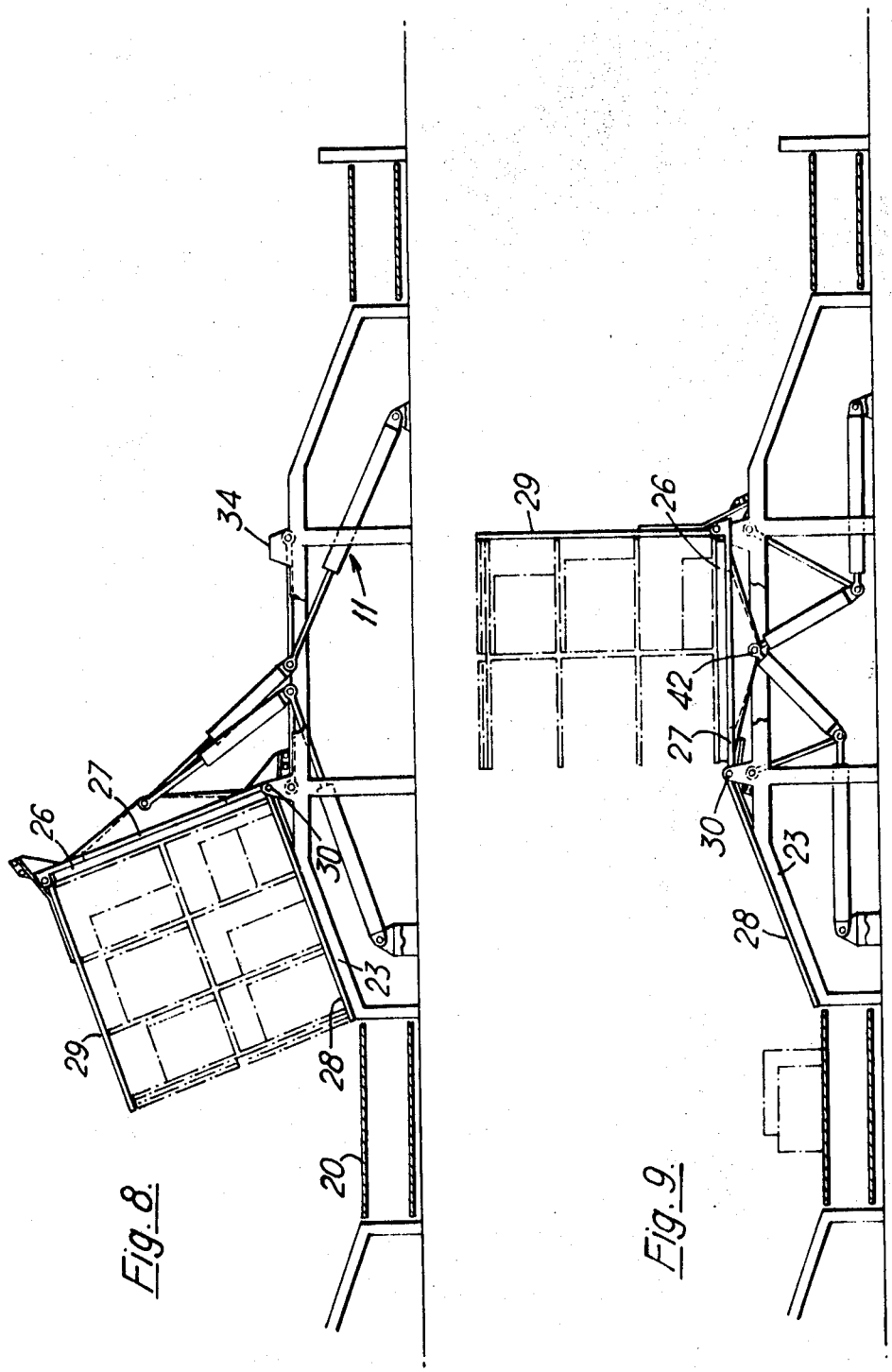

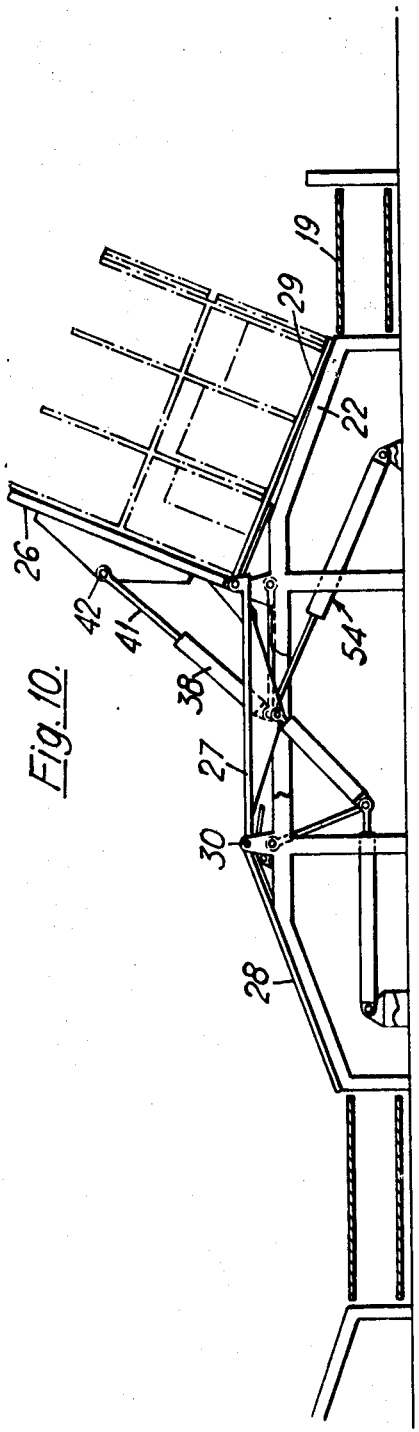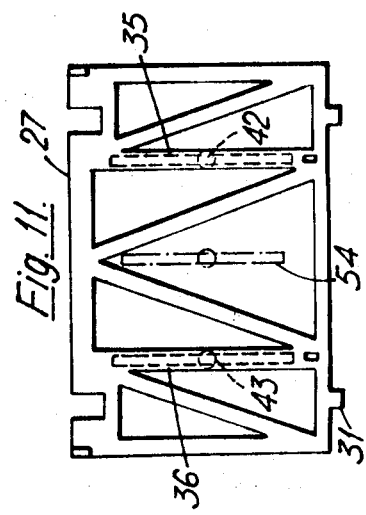

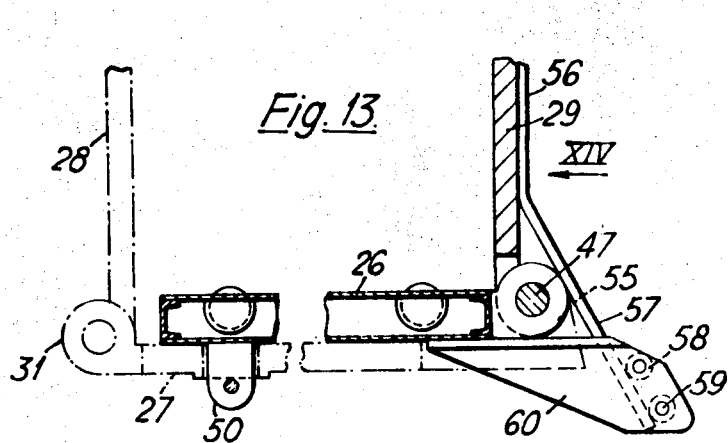
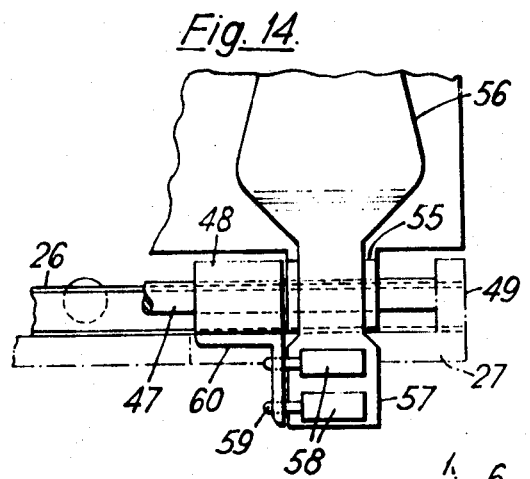
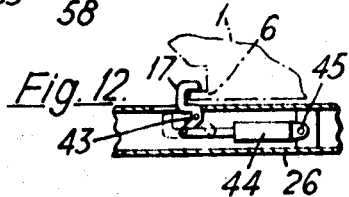
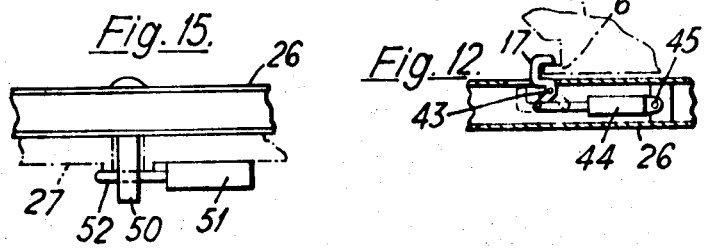
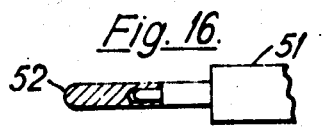

APPARATUS FOR UNLOADING BAGGAGE FROM CONTAINERS

A current development in the carriage of passengers' baggage in aircraft involves the use of containers into which baggage, say 50 to 60 pieces, is loaded in a departure building at the airport, the filled containers then being transported to the aircraft and loaded into it.

One proposed container is shown in perspective at 1 in FIG. 1 of the accompanying drawings. It is made of aluminum sheet stiffened by a central vertical partition 2, which divides it into two halves each open along one face for the reception of baggage 3 in three compartments formed by the provision of horizontal shelves 4. The open faces can be closed by folding doors 5. Flanges 6 are made along the lower edges of the sides to engage fittings in the aircraft hold and thus to keep each container in position during flight. It will be seen that the container has one partly sloping side and one vertical side. It is proposed to carry such containers in pairs in the aircraft with their vertical sides adjacent to one another, the sloping sides conforming to the contour of the aircraft.

When the aircraft reaches its destination the containers will be unloaded and taken to a terminal building. My object in this invention is to provide apparatus in the terminal building for mechanically unloading the baggage from each container so as to eliminate manual handling of the baggage at this stage.

The principle involved in apparatus according to the invention is tilting of an open-sided container to allow the baggage to slide out of the compartments onto and down a sloping surface. Normally the baggage will slide off this onto a conveyor and thus need not be touched by hand until it reaches the collecting hall in the terminal building.

Apparatus according to the invention comprises a horizontal base, mounted to rock about a horizontal axis, for the reception of the container, means for clamping the container to the base, a wall mounted to pivot relatively to the base about the same horizontal axis, means for locking the wall in a position at right angles to the base to close the open side of the container and retain baggage, means for rocking the locked base and wall as a whole about the horizontal axis to bring the wall into a downwardly inclined position with baggage retained in the container by the wall, and a support for the wall in this position. On unlocking the wall and rocking the base and the container back again the baggage slides out of the container onto the downwardly inclined wall.

When the container has two open sides, as shown in FIG. 1, it must be rocked in two opposite directions in turn in order to discharge the baggage from both sides. To enable this to be done, the apparatus may advantageously include an underbase mounted to rock about a second horizontal axis parallel to that about which the base is mounted to rock, a second wall mounted to pivot about the second horizontal axis, means for locking the second wall in a position at right angles to the underbase to close the second open side of the container and retain baggage, and means for rocking the underbase, the base and the second wall as a whole about the second axis to bring the second wall into a downwardly inclined position with baggage retained in the container by the second wall, and a support for the second wall in this position. Then on unlocking the second wall and rocking the underbase, the base and the container back again baggage slides out of the container onto the downwardly inclined second wall.

The base and the two walls form a channel into which the containers for which the apparatus is intended will fit closely. In a small airport each container may be pushed from a dock at the height of the base into the channel and then retracted again when it has been discharged, but in general it is much preferred to make the whole installation such that each container enters the channel at one end and leaves it at the other. There may be as many channels as the traffic is likely to require, and each channel advantageously is of such length as to accommodate tow or more containers at a time.

In the preferred apparatus the underbase is mounted on a hinge rod that is carried in fixed supports and that constitutes the second horizontal axis; and the base is mounted on a hinge rod which constitutes the axis about which the base rocks and which is carried by the underbase.

Since the underbase is immediately beneath the base, it is most convenient to make the underbase of open construction, and then the means for rocking the base can pass through the underbase and engage the base on its underside.

In the drawings:

FIGS. 8 to 10 are views similar to FIG. 5 showing stages in the unloading operation;

FIG. 11 is a plan of the underbase;

FIG. 12 shows means for clamping the container to the base;

FIG. 13 is a cross section on a larger scale through part of the base and a wall;

FIG. 14 is an elevation of the parts shown in FIG. 13 looking in the direction of the arrow XIV;

FIG. 15 shows a latch for locking the base to the underbase; and

FIG. 16 is a view of part of the latch of FIG. 15 on a larger scale.

Figure 1:
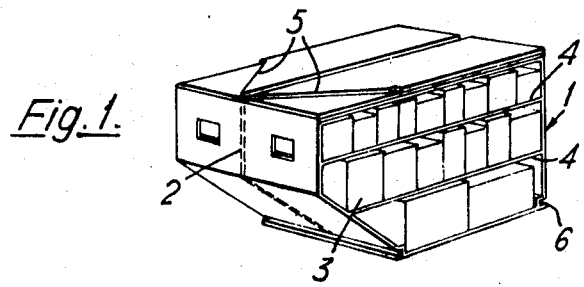
FIG. 1 is a perspective view of a baggage transporting container.
Figure 2:
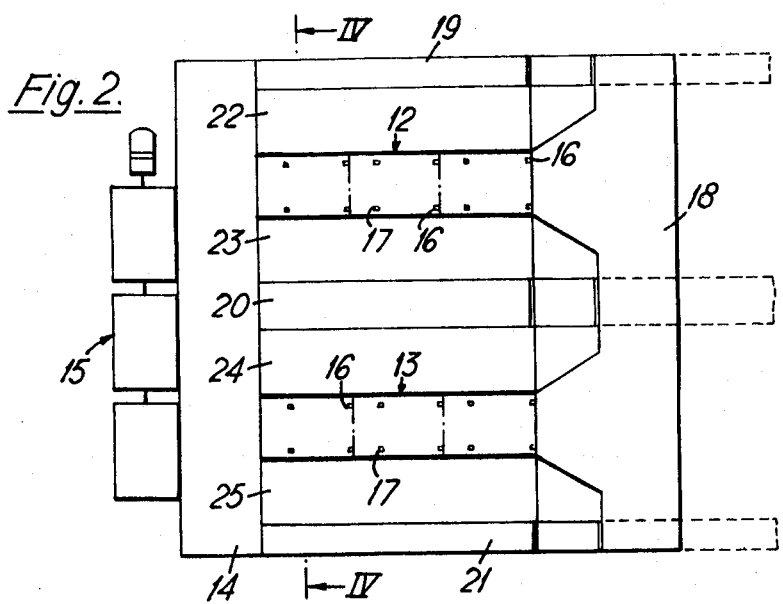
FIG. 2 is a diagrammatic plan showing the layout of a typical installation in a terminal building.
Figure 3:
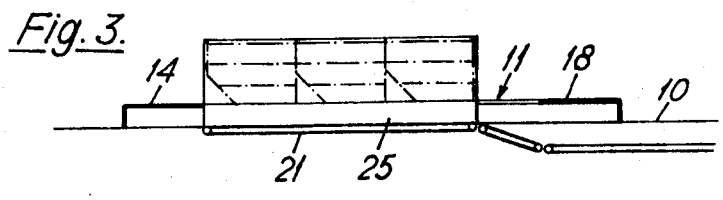
FIG. 3 is an elevation of the installation shown in FIG. 2.
Figure 4:
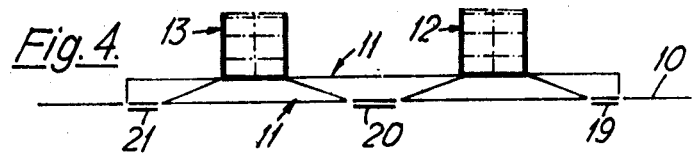
FIG. 4 is a section on the line IV—IV in FIG. 2.
Figure 7:
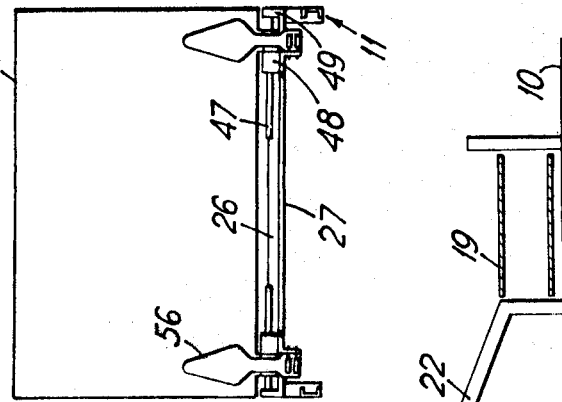
FIGS. 6 and 7 are side views looking in the directions of the arrows VI and VII respectively in FIG. 5.

In FIGS. 2 to 4 the ground level is shown at 10. The installation is constructed on a strong metal framework 11 and includes two channels 12 and 13, access to which is given from an entry dock 14. This is a platform at an appropriate height, say 2 feet, for containers to be pushed onto it from baggage trucks. FIG. 2 shows a train of three trucks 15 alongside the entry dock 14.

The loaded double-sided containers are heavy and the holds of the aircraft in which they are carried have ball-mat surfaces, that is to say ball bearings are let into the surface, and the floors of the holds also have openings through which rubber-typed wheels can be moved upwards to engage the underneath of the container and drive it along the hold, subsequently being retracted. The entry dock 14 in the present invention advantageously presents a similar ball-mat surface, with or without retractable driving wheels, as also may the base or floor of each channel. The vertical walls of each channel may also advantageously present ball-mat surfaces to the baggage that slides over them.

As shown, each channel is long enough to receive three containers, being in fact constructed in three equal lengths with a small gap between the middle length and each of the others.

When a train of trucks 15 arrives each container on it is manhandled in turn onto and over the dock 14 and into one of the channels. At the end of each section of a channel there are pivoted hooks 16 which can be swung up through the base of the channel to engage the leading flange 6 of the container and thus simultaneously to halt the container and clamp it in position in the channel. When the container has thus been clamped at its leading edge, similar hooks 17 are swung out of the base of the channel to engage the flange 6 at its trailing edge. At this stage the container is firmly clamped to the base of the channel.

The empty train of trucks now moves around the installation to come alongside a recovery dock 18 which resembles the dock 14 and to receive the empty containers when they leave their channel.

The main frame 11 includes supports for three conventional endless conveyors 19, 20 and 21. These are parallel to the channels and arranged at ground level to receive the unloaded baggage, then being taken underground to allow free vehicle movement all around the installation. FIG. 3 shows how the conveyor 21 is taken underground.

The main framework 1 also includes four steel supports 22, 23, 24 and 25, each sloping downwards from just below the bottom of a channel to the edge of a conveyor.

The essence of the invention is the construction of the channels, and one section of the channel 12 will now be described in detail with particular reference to FIGS. 5 to 10. All the other channel sections are the same. This section comprises a base 26, an underbase 27 and two restraining walls 28 and 29. The underbase 27 is a frame with openings as shown in FIG. 11, and it is mounted to rock about a horizontal axis formed by a hinge rod 30 which is engaged by eyes 31 on the underbase 27. This rod 30 extends between two end supports 32 and 33, which form part of the main frame 11. Along the edge opposite to the rod 30 the underbase 27 bears on a support 34 which is also part of the main frame 11. The underbase can be rocked about the rod 30 by two compound hydraulic rams 35 and 36 which are mounted on the ground. The ram 35 comprises two hydraulic cylinders 37 and 38 each with a piston rod. The rod 39 of the cylinder 37 is pivotally connected at its free end both to the cylinder 38 and to one end of a link 40, the other end of which is pivotally mounted in the main frame 11. The rod 41 of the cylinder 38 is pivotally connected to the underside of the underbase 27 at 42. The compound ram 36 is similarly pivotally connected to the underbase at the point shown at 43. The cylinders of both rams are connected in conventional manner to a source of operating fluid through flexible pipes, and when operated move from the position shown in FIG. 5 to that shown in FIG. 8, in which, it will be observed, the underbase 27 has been rocked through more than 90$L$ and in fact is now perpendicular to the surface of the support 23.

The base 26 is a composite structure, presenting a ball-mat surface as described above and forming a housing for retractable driving wheels. It also houses the hooks 16 and 17 and pivotal supports 43 for them shown in FIG. 12, In addition it houses hydraulic rams 44 which are pivotally mounted at 45 and the rods of which are pivotally connected to the ends of the hooks so that each hook can be rocked by remote control of the ram from the inoperative position shown in broken lines in FIG. 12 to the operative position in which it engages a flange 6 on the container.

The base 26 has eyes 48 shown in FIGS. 13 and 14 which stand up from it at the edge opposite to the hinge rod 30 and which receive a hinge rod 47 which not only passes through the eyes 48 but also enters lugs 49 on the underbase 27. The base 26 can thus rock about the axis of the hinge rod 47 relatively to the underbase 27. It can also be latched to the underbase so that the two rock together about the hinge rod 30. To enable this latching to be effected the base carries a downwardly projecting lug 50 with an opening in it, as shown in FIGS. 13 and 15, and the underbase carries a small hydraulic ram 51, the end of the rod of which is constituted by a pin 52 which enters the opening in the lug 50 when the ram is actuated. As shown in FIG. 16, the pin 52 is threaded to the rod proper of the ram, and can be discarded and replaced when it becomes worn.

In order to rock the base 26 separately from the underbase 27 when the latch formed by the pin 52 is withdrawn, a third compound hydraulic ram 54 similar to the rams 35 and 36 is provided and is mounted centrally between those two rams so that part of it can pass freely through the main central opening in the underbase. This ram 54 is pivoted to the underside of the base so that it can rock the base upwards and bring it back again.

The wall 29 has eyes 55 which engage the hinge rod 47, so that it too can rock about that rod. It can be locked at right angles to the base 26 so that the two can rock as a unit, or can be unlocked from it so that they can move separately. One lock is shown in FIGS. 13 AND 14. It includes a plate 56 bolted to the wall 28 and extending below the underbase as an outwardly inclined tail as shown at 57. This tail carries two rams 58 which are similar to the ram 51 and carry pins 59 which engage in openings in a bracket 60 which is bolted to the underside of the base 26. When the rams 58 are operated the wall 29 and the base 26 move as a unit. The support 34 is interrupted opposite the plate 56 to allow free movement.

The wall 28 can also be latched in similar manner to the underbase 27, so that these two move as a unit, or unlatched from it so that the two move separately.

All the rocking and locking movements are controlled from a console by a single operator as is well understood in the art of hydraulic control.

The unloading of one container will now be described with particular reference to FIGS. 5 to 10.

Figure 5:
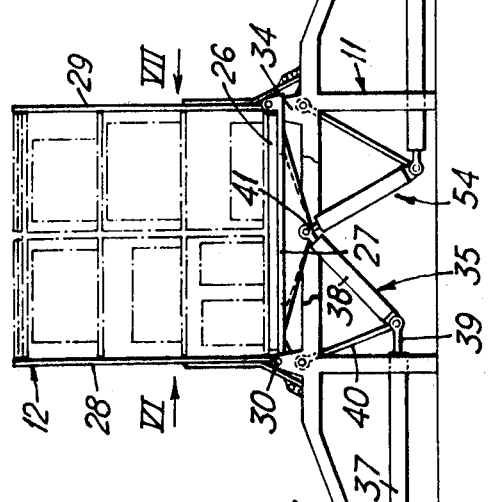
FIG. 5 is a diagrammatic view on a larger scale showing a container in position in a channel.
Figure 6:
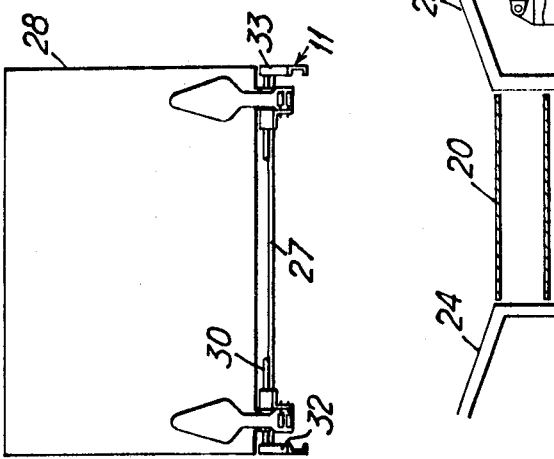

With the container 1 in position as shown in FIG. 5 and clamped to the base 26, and with the doors 5 folded so that both sides are open, the stages in the discharge of the baggage are as follows. First the whole apparatus with the container inside it is rocked about the axis of the rod 30 into the position shown in FIG. 8, in which the wall 28 is downwardly inclined at an angle of about 30$L$ to the horizontal. The apparatus is supported in this position by the support 23, and the lower end of the wall 28 is close to and just above the conveyor 20. The baggage in the compartments on one side of the container 1 moves under gravity to come into contact with and rest on the wall 28. Next the wall 28 is unlocked from the underbase 27, and the remainder of the apparatus is rocked back into the position shown in FIG. 9, the wall 28 remaining in its inclined position. As the container is thus rocked back it leaves the baggage behind. This baggage slides down the wall 28 on to the conveyor 20.

Next the base 26 is unlocked from the underbase 27, and the wall 29 and base 26 are rocked together about the axis of the rod 47 into the position shown in FIG. 10. The wall 29 makes contact in its inclined position with the support 22. The baggage in the compartments on the other side of the container moves into contact with the wall 29. The base 26 is unlocked from this wall and is rocked back into the horizontal position, carrying the container with it, and the baggage slides down the wall 29 onto the conveyor 19.

The empty container may now be unlocked from and pushed off the base 26. The rocking movements are next effected in reverse sequence so that the wall 29 can be locked again at right angles to the base 26 and carried to the position shown in FIG. 8. The wall 28 is then locked again to the underbase 27 and the apparatus is rocked into position to receive a fresh loaded container.

Although the invention has been described in connection with containers for passengers' baggage, it may also be used in the discharge of containers of appropriate cargo.

The apparatus shown can, of course, be used to unload a container with no central partition, the unloading then being complete when the position shown in FIG. 9 is reached.

In apparatus according to the invention designed to unload only containers having no central partitions, the underbase may be omitted and one edge of the base may rest on a support such as that shown at 34, the base being hinged to the main framework at the other edge.

I claim:

1. Apparatus for use in unloading baggage from an open-sided container comprising a horizontal base, mounted to rock about a horizontal axis, for the reception of the container, means for clamping the container to the base, a wall mounted to pivot relatively to the base about the same horizontal axis, means for locking the wall in a position at right angles to the base to close the open side of the container and retain baggage, means for rocking the locked base and wall as a whole about the horizontal axis to bring the wall into a downwardly inclined position with baggage retained in the container by the wall, and a support for the wall in this position, whereby on unlocking the wall and rocking the base and the container back again baggage slides out of the container onto the downwardly inclined wall.

2. An apparatus according to claim 1, for use with a container having two open sides, comprising an underbase mounted to rock about a second horizontal axis parallel to that about which the base is mounted to rock, a second wall mounted to pivot about the second horizontal axis, means for locking the second wall in a position at right angles to the underbase to close the second open side of the container and retain baggage, and means for rocking the underbase, the base and the second wall as a whole about the second axis to bring the second wall into a downwardly inclined position with baggage retained in the container by the second wall, and a support for the second wall in this position, whereby on unlocking the second wall and rocking the underbase, the base and the container back again baggage slides out of the container onto the downwardly inclined second wall.

3. An apparatus according to claim 1 in which the means for clamping a container to the base comprise pivoted hooks mounted in the base to swing out of the base to engage the container.

4. An apparatus according to claim 2 in which the underbase is mounted on a hinge rod that is carried in fixed supports and that constitutes the second horizontal axis.

5. An apparatus according to claim 4 in which the base is mounted on a hinge rod which constitutes the axis about which the base rocks and which is carried by the underbase.

6. An apparatus according to claim 2 in which the underbase is of open construction and the means for rocking the base pass through the underbase and engage the base on its underside.

7. An apparatus according to claim 6 in which the means for rocking the underbase comprise two rams connected to the underside of the underbase, and the means for rocking the base comprise a ram passing through the underbase.

8. An apparatus according to claim 1 in combination with a dock at the height of the base for the passage of containers into the apparatus, and a conveyor at the base of the inclined wall support.

9. An apparatus according to claim 8 also comprising a second dock at the opposite end of the apparatus and at the height of the base thereof.

10. An apparatus according to claim 8 in combination with a framework supporting the base above ground level, the conveyor being taken below ground level.